United States Patent
Maqbool et al.

(10) Patent No.: US 11,585,532 B2
(45) Date of Patent: Feb. 21, 2023

(54) METHOD AND APPARATUS FOR THE START-UP AND CONTROL OF PULSE COMBUSTORS USING SELECTIVE INJECTOR OPERATION

(71) Applicant: North American Wave Engine Corporation, College Park, MD (US)

(72) Inventors: Daanish Maqbool, Hyattsville, MD (US); Nitay Ravin, Germantown, MD (US); Carson Myers, Hyattsville, MD (US)

(73) Assignee: NORTH AMERICAN WAVE ENGINE CORPORATION, College Park, MD (US)

( * ) Notice: Subject to any disclaimer, the term of this patent is extended or adjusted under 35 U.S.C. 154(b) by 461 days.

(21) Appl. No.: 16/386,386

(22) Filed: Apr. 17, 2019

(65) Prior Publication Data

US 2020/0256260 A1  Aug. 13, 2020

Related U.S. Application Data

(60) Provisional application No. 62/725,117, filed on Aug. 30, 2018, provisional application No. 62/658,989, filed on Apr. 17, 2018.

(51) Int. Cl.
*F23R 7/00* (2006.01)
*F02K 7/067* (2006.01)
(Continued)

(52) U.S. Cl.
CPC ............ *F23R 7/00* (2013.01); *F02C 9/48* (2013.01); *F02K 7/067* (2013.01); *F02C 5/10* (2013.01);
(Continued)

(58) Field of Classification Search
CPC .............. F23R 7/00; F02K 7/06; F02C 5/10
See application file for complete search history.

(56) References Cited

U.S. PATENT DOCUMENTS 2,480,540 A * 8/1949 Bodine, Jr. .......... F02K 7/06
60/247
2,480,626 A  8/1949 Bodine
(Continued)

FOREIGN PATENT DOCUMENTS

CN  85101521 A  1/1987
CN  87105408 A  3/1988
(Continued)

OTHER PUBLICATIONS https://netl.doe.gov/node/7553 "Pressure Gain Combustion" NETL, US Dept. of Energy, downloaded Dec. 28, 2021.*
(Continued)

*Primary Examiner* — Ted Kim
(74) *Attorney, Agent, or Firm* — Wilmer Cutler Pickering Hale and Dorr LLP (57) ABSTRACT

A system and method is disclosed for the start-up and control of pulsejet engines and this system includes an Electronic Fuel Injection ("EFI") system that further includes one or more electrically controlled fuel injectors that can be selectively operated for start-up and control of such pulsejet engines. According to the system and method, the rate and/or pattern of fuel delivery to pulsejet engines can be varied not only by controlling the amount of time the fuel injectors are open versus closed to define a "duty cycle," but also with the capability to selectively disable one or more fuel injectors in the programmed manner for start-up and control of such pulsejet engines.

17 Claims, 3 Drawing Sheets

(51) Int. Cl.
    *F02C 9/48*    (2006.01)
    *F23N 1/00*    (2006.01)
    *F02C 5/10*    (2006.01)

(52) U.S. Cl.
    CPC .... *F05D 2270/301* (2013.01); *F23C 2205/10* (2013.01); *F23N 1/002* (2013.01)

(56) References Cited

U.S. PATENT DOCUMENTS

| | | | |
|---|---|---|---|
| 2,496,351 A * | 2/1950 | Mazzoni | F02K 7/06 60/39.77 |
| 2,523,308 A * | 9/1950 | Kemmer | F02K 7/06 60/225 |
| 2,543,758 A | 3/1951 | Bodine | |
| 2,557,128 A * | 6/1951 | Magill | F02K 7/06 60/247 |
| 2,628,471 A | 2/1953 | Dunbar | |
| 2,632,294 A * | 3/1953 | Wall | F02K 7/06 60/243 |
| 2,639,580 A | 5/1953 | Stuart | |
| 2,698,510 A * | 1/1955 | Britton | F02K 7/06 60/209 |
| 2,731,795 A | 1/1956 | Bodine | |
| 2,745,861 A | 5/1956 | Bodine | |
| 2,750,733 A | 6/1956 | Paris | |
| 2,796,734 A | 6/1957 | Bodine | |
| 2,812,635 A | 11/1957 | Foll et al. | |
| 2,834,181 A | 5/1958 | Paris | |
| 2,834,183 A | 5/1958 | Bertin et al. | |
| 2,838,102 A | 6/1958 | Reimers | |
| 2,857,332 A | 10/1958 | Tenny et al. | |
| 2,860,484 A | 11/1958 | Schmidt | |
| 2,872,780 A | 2/1959 | Schmidt | |
| 2,919,542 A | 1/1960 | Servanty et al. | |
| 2,937,500 A | 5/1960 | Bodine, Jr. | |
| 2,948,113 A * | 8/1960 | Lettice | F02K 7/02 60/247 |
| 3,005,310 A | 10/1961 | Reder | |
| 3,035,413 A | 5/1962 | Linderoth | |
| 3,044,252 A | 7/1962 | Zwicky | |
| 3,185,871 A | 5/1965 | Bodine, Jr. | |
| 3,303,643 A | 2/1967 | Beardsley | |
| 3,462,955 A | 8/1969 | Lockwood | |
| 3,606,867 A | 9/1971 | Weissinger | |
| 3,768,926 A | 10/1973 | Pegg et al. | |
| 4,033,120 A | 7/1977 | Kentfield | |
| 4,314,444 A | 2/1982 | Putnam et al. | |
| 4,840,558 A | 6/1989 | Saito et al. | |
| 5,353,721 A | 10/1994 | Mansour et al. | |
| 5,428,951 A * | 7/1995 | Wilson | F23M 20/005 60/776 |
| 5,638,609 A | 6/1997 | Chandran | |
| 5,665,272 A * | 9/1997 | Adams | F02K 7/06 102/334 |
| 6,477,829 B1 | 11/2002 | Hunter et al. | |
| 6,640,549 B1 | 11/2003 | Wilson et al. | |
| 6,793,174 B2 | 9/2004 | Ouellette et al. | |
| 7,637,096 B2 | 12/2009 | Razzell et al. | |
| 8,408,004 B2 | 4/2013 | Davis, Jr. et al. | |
| 8,607,542 B2 | 12/2013 | Mason | |
| D757,859 S | 5/2016 | Goitein | |
| D759,764 S | 6/2016 | Lai | |
| 9,527,588 B1 | 12/2016 | Rollefstad | |
| D784,854 S | 4/2017 | Huang et al. | |
| D795,785 S | 8/2017 | Morrison et al. | |
| D800,602 S | 10/2017 | Hsiao et al. | |
| D801,223 S | 10/2017 | Hsiao et al. | |
| D808,860 S | 1/2018 | Tian et al. | |
| D809,992 S | 2/2018 | Hu et al. | |
| D816,582 S | 5/2018 | Liang et al. | |
| 10,546,070 B2 | 1/2020 | Hellat et al. | |
| 10,995,703 B2 | 5/2021 | Maqbool | |
| 11,434,851 B2 | 9/2022 | Maqbool | |
| 2005/0138933 A1 * | 6/2005 | Tegner | F02K 9/805 60/776 |
| 2006/0260291 A1 * | 11/2006 | Vandervort | F02K 7/02 60/39.76 |
| 2007/0245712 A1 * | 10/2007 | Shimo | F02K 7/04 60/249 |
| 2009/0139203 A1 * | 6/2009 | Rasheed | F23R 7/00 60/247 |
| 2009/0178415 A1 | 7/2009 | Kretschmer | |
| 2010/0139240 A1 | 6/2010 | Levasseur | |
| 2012/0083945 A1 | 4/2012 | Oakley et al. | |
| 2012/0131901 A1 | 5/2012 | Westervelt et al. | |
| 2012/0204534 A1 | 8/2012 | Kenyon et al. | |
| 2013/0019602 A1 | 1/2013 | Kim et al. | |
| 2014/0260294 A1 * | 9/2014 | Farshchian | F02C 7/22 60/773 |
| 2014/0339355 A1 | 11/2014 | Olm et al. | |
| 2016/0001879 A1 | 1/2016 | Johannesson et al. | |
| 2016/0290223 A1 | 10/2016 | Mills | |
| 2016/0304196 A1 | 10/2016 | Alber | |
| 2017/0082067 A1 | 3/2017 | Maqbool | |
| 2017/0144756 A1 | 5/2017 | Rastgaar Aagaah et al. | |
| 2017/0152035 A1 | 6/2017 | Zhao et al. | |
| 2017/0210470 A1 | 7/2017 | Pardell | |
| 2017/0297707 A1 | 10/2017 | Rollefstad et al. | |
| 2018/0065735 A1 | 3/2018 | Ichihara | |
| 2020/0003158 A1 | 1/2020 | Maqbool | |
| 2020/0158048 A1 | 5/2020 | Maqbool | |
| 2021/0108590 A1 | 4/2021 | Maqbool et al. | |

FOREIGN PATENT DOCUMENTS

| | | |
|---|---|---|
| CN | 2050553 U | 1/1990 |
| CN | 101907038 A | 12/2010 |
| CN | 111271735 A | 6/2020 |
| DE | 102013216398 A1 | 2/2015 |
| EP | 1348908 A2 | 10/2003 |
| EP | 2642204 A1 | 9/2013 |
| EP | 3390796 A1 | 10/2018 |
| EP | 3587925 B1 | 10/2021 |
| FR | 951942 A | 11/1949 |
| GB | 781482 A | 8/1957 |
| GB | 789701 A | 1/1958 |
| GB | 0409664 | 6/2004 |
| GB | 2420615 A | 5/2006 |
| JP | H0249933 A | 2/1990 |
| WO | WO-2016200459 A2 | 12/2016 |
| WO | WO-2019204389 | 10/2019 |

OTHER PUBLICATIONS

International Search Report and Written Opinion issued by the European Patent Office as International Searching Authority, issued in PCT/US19/27801, dated May 31, 2019 (16 pages).

Blomquist, C. A., "Experimental Gas-Fired Pulse-Combustion Studies", prepared for Jet Propulsion Laboratory, for U.S. Department of Energy, Argonne National Laboratory, ANL/EES-TM-214, Sep. 1982 (313 pages—full document).

Evans, R.G. et al., "Pulse Jet Orchard Heater System Development: Part I. Design, Construction, and Optimization", Transactions of the ASABE, 52(2):331-343, 2009 (13 pages).

Heutschi, "Acoustics II: Electrical-Mechanical-Acoustical Analogies", Eidgenössische Technische Hochschule Zürich, Swiss Federal Institute of Technology Zurich, Jan. 18, 2013 (91 pages).

International Search Report and Written Opinion issued by the European Patent Office as International Searching Authority for International Application No. PCT/US2016/023238 dated Dec. 5, 2016 (11 pages).

International Search Report and Written Opinion issued by the European Patent Office as International Searching Authority for International Application No. PCT/US2016/067242 dated May 18, 2017 (14 pages).

International Search Report and Written Opinion issued by the U.S. Patent and Trademark Office as International Searching Authority for International Application No. PCT/US2016/023241 dated Nov. 29, 2016 (6 pages).

(56) References Cited

OTHER PUBLICATIONS

Ipakchi, H., "Development and performance characteristics of a family of gas-fired pulsed combustors.", Thesis for Middlesex University School of Engineering Systems, Jun. 2000 (291 pages—full document).

Poinsot, T.J. et al., "Vortex-driven acoustically coupled combustion instabilities", J. Fluid Mech, 177:265-292, 1987 (28 pages).

Reynst, F. H., "Pulsating Combustion," Pergamon Press, 6 pages—Cover Page, Copyright Page, Table of Contents and pp. 208-209 (1961).

Zheng, F. et al., "A New Acoustic Model for Valveless Pulsejets and Its Application to Optimization Thrust", Journal of Engineering for Gas Turbines and Power, 130:041501-1-041501-9, Jul. 2008 (9 pages).

European Search Report issued in EP19191692.3, dated Sep. 30, 2019 (7 pages).

Giammar, R.D. et al., "Noise Reduction Using Paired Pulse Combustors", Journal Energy, 2(5):319-320, Sep.-Oct. 1978 (2 pages).

"Standing Waves Review", Khan Academy, https://www.khanacademy.org/science/ap-physics-1/ap-mechanical-waves-and-sound/standing-waves-ap/a/standing-waves-review-ap, accessed Jul. 16, 2020 (3 pages).

International Preliminary Report on Patentability issued by the European Patent Office in International Application No. PCT/US2019/039510, dated Jan. 7, 2021 (8 pages).

International Preliminary Report on Patentability, issued by the European Patent Office as International Searching Authority, in International Application No. PCT/US2019/027801, dated Oct. 29, 2020 (10 pages).

International Search Report and Written Opinion issued by the European Patent Office as International Searching Authority, issued in International Application No. PCT/US2019/039510 dated May 26, 2020 (14 pages).

Westberg, F., "Inside the pulsejet engine: Report 1.0", <URL: http://www.geocities.com/Area51/Rampart/9722/welcome.htm>, Apr. 25, 2000 (39 pages).

Wintenberger, E. et al. "Detonation Waves and Pulse Detonation Engines," Explosion Dynamics Laboratory, Graduate Aeronautical Laboratories, California Institute of Technology, Pasadena, CA 91125, Ae103 Class Notes, https://shepherd.caltech.edu/EDL/projects/pde/Ae103-012704.pdf, Jan. 27, 2004 (37 pages).

Brown, R. G., "Stationary Waves," Physics Department, Duke University, Durham, NC 27708, Physics 51 Review/Lecture Notes, http://webhome.phy.duke.edu/~rgb/Class/phy51/phy51/node34.html Apr. 12, 2004 (3 pages).

Claerbout, J., "Derivation of the Acoustic Wave Equation," Imaging the Earth's Interior, Geophysics Department, Stanford University, Stanford, CA 94305, Stanford Exploration Project, http://sepwww.stanford.edu/sep/prof/iei/xrf/paper html/node13.html, Oct. 31, 1997 (2 pages).

* cited by examiner

METHOD AND APPARATUS FOR THE START-UP AND CONTROL OF PULSE COMBUSTORS USING SELECTIVE INJECTOR OPERATION

CROSS-REFERENCES TO RELATED APPLICATIONS

This Application claims the benefit under 35 U.S.C. 119(e) to U.S. Provisional Patent Application No. 62/658,989, filed Apr. 17, 2018, and U.S. Provisional Patent Application No. 62/725,117, filed Aug. 30, 2018, the entirety of each is explicitly incorporated by reference herein.

All publications, patent applications, patents, or other references mentioned herein are incorporated by reference in their entirety. The patent and scientific literature referred to herein establishes knowledge that is available to those skilled in the art. The issued patents, applications, and other publications that are cited herein are hereby incorporated by reference to the same extent as if each was specifically and individually indicated to be incorporated by reference. In the case of inconsistencies, the present disclosure will prevail.

FIELD OF THE INVENTION

The present invention relates to combustors and jet engines. More specifically, the present invention relates to pulse combustors and/or pulsejet engines and their control systems and methods of operation.

BACKGROUND THE INVENTION

A typical conventional pulse combustor (or valveless-type pulsejet engine) includes a combustion chamber, an inlet pipe, at least one fuel injector, a spark plug (or other ignition device), and an exhaust pipe that is sometimes referred to as a "tailpipe." The combustion chamber, inlet pipe, and exhaust pipe are often cylindrical in shape with different lengths and cross-sectional diameters. The diameter of the inlet and exhaust pipes is typically less than the diameter of the combustion chamber; and the length of the inlet pipe is typically less than the length of the exhaust pipe. Further, the diameter of the exhaust pipe can increase from its proximal end where it connects to the combustion chamber to its distal end.

At engine startup, fuel and air are introduced into the combustion chamber and the spark generated by the spark plug or other ignition device ignites the fuel-air mixture. The ensuing combustion causes a rise in the temperature and pressure of the gases in the combustion chamber. These gases expand and escape to the atmosphere from the ends of the inlet and exhaust pipes. The high velocity and inertia of the escaping gases causes a pressure drop inside the combustion chamber, ultimately resulting in a negative pressure in the combustion chamber. This negative pressure reverses the direction of the fluid flow in the inlet and exhaust pipes and causes air from the atmosphere to be sucked into the combustion chamber through the inlet pipe. Atmospheric air is also sucked into the exhaust pipe, but it does not reach the combustion chamber because of the length of the exhaust pipe. The fresh atmospheric air that reaches the combustion chamber through the inlet pipe mixes with the fuel that is injected in either the inlet pipe or combustion chamber. The fuel-air mixture within the combustion chamber then meets the high temperature combustion products in the combustion chamber from the previous combustion event. These combustion products ignite the fresh fuel-air mixture to produce the next combustion event. Thus, a spark plug or other ignition device is only needed to start engine operation and not to sustain engine operation. As such, the spark plug or other ignition device can be turned off once the engine is started.

This repeating series of events for the engine, i.e., suction, ignition/combustion, and exhaust, constitute the working cycle of the engine, or simply the "engine cycle." The resulting periodic pressure oscillation induced inside the engine is referred to as the "engine pressure cycle." While there can be a discrete combustion event for each engine cycle, in many cases, the combustion process does not fully conclude/finish over an engine cycle. As a result, combustion may never totally cease during an engine cycle, but rather results in oscillation between a maximum and minimum combustion intensity over an engine cycle. Regardless of the exact behavior of combustion intensity over an engine cycle, the periodic variation or pattern in combustion intensity can be referred to as a "combustion cycle."

The net result of the described working cycle of a pulse combustor is intermittent jets of gas being driven from the ends of the inlet and exhaust pipes, and these jets are responsible for thrust generation. The exhaust pipe usually generates the largest amount of thrust, but the inlet pipe can also generate a significant amount of thrust. To take advantage of this, the exhaust pipe is usually turned so that its distal end points in the same direction as the distal end of the inlet pipe (or vice versa). This gives the pulse combustor a "U-shape." Noting this, pulse combustors can have a variety of forms. For example, some have multiple inlets, while others have inlets that are perpendicular to the exhaust pipe. Notwithstanding, all of these embodiments have the same working principle.

The system that has just been described can be used as a combustor for heating or for jet propulsion/thrust production. The advantages of such pulse combustors include the ability to draw in fresh air and sustain operation without any external machinery or moving parts. Pulse combustors are commonly referred to as "pulsejet" or "pulse jet" engines when used for thrust production. Pulsejet engines have a long history and have been used to propel several different aircraft over the last century.

Pulse combustors are characterized by their ease of production, simple operation, low weight and lack of moving parts. However, important historical limitations for these devices include high noise and vibration levels, and low fuel efficiency. All of these limitations have led to their under-utilization in both the commercial and military markets.

Electronic Fuel Injection ("EFI") methods have been used to help address some of the aforementioned limitations. Typically, these methods use electronic controls and electronically-controlled fuel injectors to inject fuel at an optimal point or in an optimal pattern in the engine pressure cycle. To accomplish this, the engine pressure cycle is sensed using a fluid pressure or velocity sensor placed in, on, or around the engine. However, a simple adaptation of current state-of-the-art EFI systems, which have been primarily developed for automotive engines, for use with pulsejet engines has been found to lead to complications affecting a pulsejet engine's starting and throttling ability.

A problem in adapting conventional EFI systems for use with pulsejets is the limitation of the amount of fuel that can be provided to the engine. Conventional EFI systems that are designed for piston-driven automobile engines have a fixed fuel supply pressure. This means the amount of fuel delivered during an engine cycle can only be varied by changing the amount of time the injectors are "open" or "on" during each engine cycle. The amount of time the injectors are "open" or "on" versus "closed" or "off" is referred to as the engine's "duty cycle." However, fuel injectors typically have practical duty cycle limits. If the electrical signal that controls the duty cycle is too short, the injectors will not have time to fully open before the electrical signal is received to cut off and if the electrical control signal is too long, the injectors will not have enough time to close and virtually operate in a perpetually "open" or "on" state. For these reasons, it is difficult to supply fuel accurately over a wide range of fuel flow rates, particularly for high frequencies, such as those required for pulsejet engines, which typically operate between 50 and 250 Hz.

Another problem in adapting conventional EFI systems for pulsejets is associated with the engine start-up process. Pulsejet engines are usually started by blowing air into the inlet pipe, followed by the injection of fuel and spark ignition. Pulsejet engine start-up is most likely successful when fuel is consistently available, particularly in the initial inflow part of the first few cycles. At the starting phase of the engine, there is no engine cycle to generate a fluid pressure within the pulse combustor beyond atmospheric pressure for a pressure or velocity sensor to sense that will enable an engine controller to generate the appropriate timing signals for fuel injection. So, conventional EFI systems can effect engine start-up by holding the injectors open/on for as long as practically possible, i.e., by maximizing the duty cycle, because this maximizes the likelihood the fuel injectors will supply fuel during initial inflow events. However, operating at a high duty cycle like this also causes a large amount of fuel to be delivered to the pulsejet engine and means such an engine start is being attempted at a high throttle condition. This is an undesirable throttle condition for starting a pulsejet engine. A better starting condition would be a mid-throttle or low-throttle starting condition. Of the three, low-throttle engine startup is more highly desirable to prevent and/or reduce the risk of damage to nearby property and/or harm to personnel who may be in the vicinity of the engine. High-throttle conditions make damage to property and/or nearby personnel during engine start much more likely. As such, it is highly desirable to start pulsejet engines under low-throttle conditions.

Therefore, there is a need for a new and novel control and start-up system and method for pulsejets that overcomes the problems in the past.

SUMMARY OF THE INVENTION

The present invention is directed to pulsejet engines that have a novel Electronic Fuel Injection ("EFI") system that includes one or more electrically controlled fuel injectors that can be selectively operated for start-up and controlling such pulsejet engines. The rate and/or pattern of fuel delivery to pulsejet engines according to the present invention can be varied not only by controlling the amount of time the injectors are open versus closed to define a "duty cycle," but also with the capability to selectively disable one or more fuel injectors in the programmed manner for start-up and control of pulsejet engines. This capability to selectively disable one or more injectors provides a novel method by which the engine controller under operator control can control the pulsejet engine over a wider throttle range, provide increased efficiency and stability in engine operation, and reduce the likelihood of engine operation shutdown due to injection timing inaccuracies or physical cycle-to-cycle variation.

The present invention contemplates a system and method for improved pulsejet engine start-up by selectively disabling one or more fuel injectors, so that during engine start-up, the fewest number of fuel injectors need to be held open/on for as long as practically with the maximum time being for the full length of the engine cycle. This will dramatically increase the likelihood fuel will be available to the engine during the initial air inflow event during the start-up process. This will also result in a smaller overall amount of fuel being supplied to the pulsejet engine than would be the case if all of the injectors were operational. Therefore, implementation of the present invention will result in a much higher likelihood of a successful engine start-up and operational stability under low-throttle conditions. Fuel injector selectivity can also be used during normal engine operation for more efficient and sustained engine operation.

An embodiment of the pulse combustor system with improved startup and control of the present invention is disclosed that preferably includes a pulse combustor, an air supply subsystem with the capability to provide air under predetermined pressure into the inlet pipe, a fuel supply subsystem with the capability to provide fuel under predetermined pressure to a plurality of fuel injectors, and a pulse combustor controller. The pulse combustor also includes an inlet pipe having a proximal and distal end, with the inlet pipe having a first length and being in fluid communication with a combustion chamber, an exhaust pipe having a proximal and distal end, with the exhaust pipe having a second length greater than the first length of the inlet pipe and being in fluid communication with the combustion chamber, the combustion chamber having a first end having a first opening for connecting to the proximal end of the inlet pipe for fluid communication between the combustion chamber and the inlet pipe and a second end having a second opening for connecting to the proximal end of the exhaust pipe for fluid communication between the combustion chamber and exhaust pipe, a plurality of fuel injectors disposed around at least the inlet pipe or the combustion chamber for injecting fuel under pressure into the inlet pipe or the combustion chamber for mixing with air ingressing from the distal end of the inlet pipe to form combustible fuel-air mixtures, an ignition subsystem disposed on the combustion chamber for providing means for igniting discrete fuel-air mixtures within the combustion chamber to cause combustion events, with each combustion event causing jets of gas to be output from the distal ends of the inlet and exhaust pipes, and a sensor subsystem for continuously monitoring predetermined physical properties within the combustion chamber and generating output electrical signals representative of operating states of the pulse combustor that includes at least a pre-startup operating state and continuous operating states after pulse combustor startup. Preferably, the pulse combustion controller is electrically connected to a system operator that is capable of providing electrical control signals to the pulse combustion controller for its operation. The system operator includes programmable computer-based devices and human operators interacting with the pulse combustion controller through a programmable computer-based device or interface.

According to this embodiment, the pulse combustor controller is electrically connected to the air supply subsystem, the plurality of fuel injectors, the ignition subsystem, and the sensor subsystem, with the pulse combustor controller being capable of electrically controlling the air subsystem, the fuel supply subsystem, the plurality of fuel injectors, and the ignition subsystem. The pulse combustor controller also receives electrical signals from the sensor subsystem. Further, the pulse combustor controller is capable of controlling the selective activation and deactivation of fuel injectors of the plurality of fuel injectors for different operating states of the pulse combustor.

In another embodiment of the pulse combustor system of the present invention, the pulse combustor controller receives electrical signals from the sensor subsystem, with the pulse combustor controller being capable of determining an operating state of the pulse combustor according to measurements of physical properties within the combustion chamber that the sensor subsystem converts to electrical signals representative of the measurements and other possible commands it may receive, for example, from a system operator, and the pulse combustor controller programmatically controls the operating states of the pulse combustor.

In a further embodiment of the pulse combustor system of the present invention, the pulse combustor controller will begin a startup process for the pulse combustor when commanded to the system operator if the pulse combustor controller determines the electrical signals received from the sensor subsystem are representative of the pulse combustor not being in a continuous operating state, the pulse combustor controller will send electrical control signals to the fuel supply subsystem to provide fuel under pressure to the fuel injectors, send electrical control signals to the air supply subsystem to input air under pressure into the inlet pipe, send electrical control signals to the fuel injectors to selectively activate one or more of the fuel injectors for injection of fuel into the inlet pipe or combustion to form discrete fuel-air mixtures with air from the air supply subsystem that are input to, or formed in, the combustion chamber, and send electrical control signals to the ignition subsystem for causing ignition of the discrete fuel-air mixtures in the combustion chamber to start the pulse combustor.

In yet another embodiment of the pulse combustor system of the present invention, the pulse combustor controller will control continuous operation of the pulse combustor if the pulse combustor controller determines the electrical signals received from the sensor subsystem are representative of the pulse combustor being in a continuous operating state, the pulse combustor controller will send electrical control signals to the fuel supply subsystem to provide fuel under pressure to the fuel injectors, send electrical control signals to the fuel injectors to selectively activate one or more up to the total number of fuel injectors for injecting fuel in the inlet pipe or combustion chamber to form discrete fuel-air mixtures at a rate to match the predetermined operating state of the pulse combustor, and cease to send activation electrical control signals to the air supply subsystem.

The present invention will be described in greater detail in the remainder of the specification referring to the drawings.

REFERENCE NUMERALS IN THE DRAWING(S)

Figure 1:
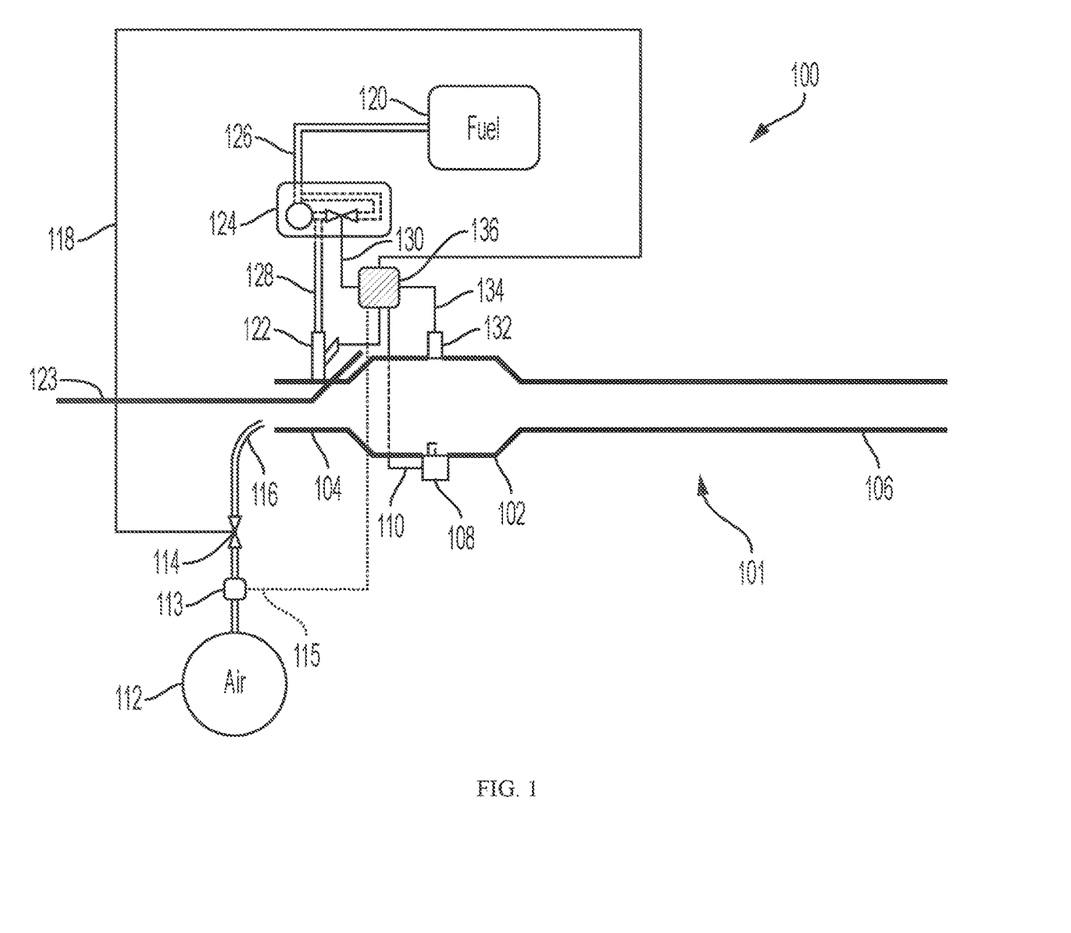
FIG. 1 shows a representative schematic diagram of an embodiment of the system of the present invention for start-up and control of pulse combustor operations.
Figure 2:
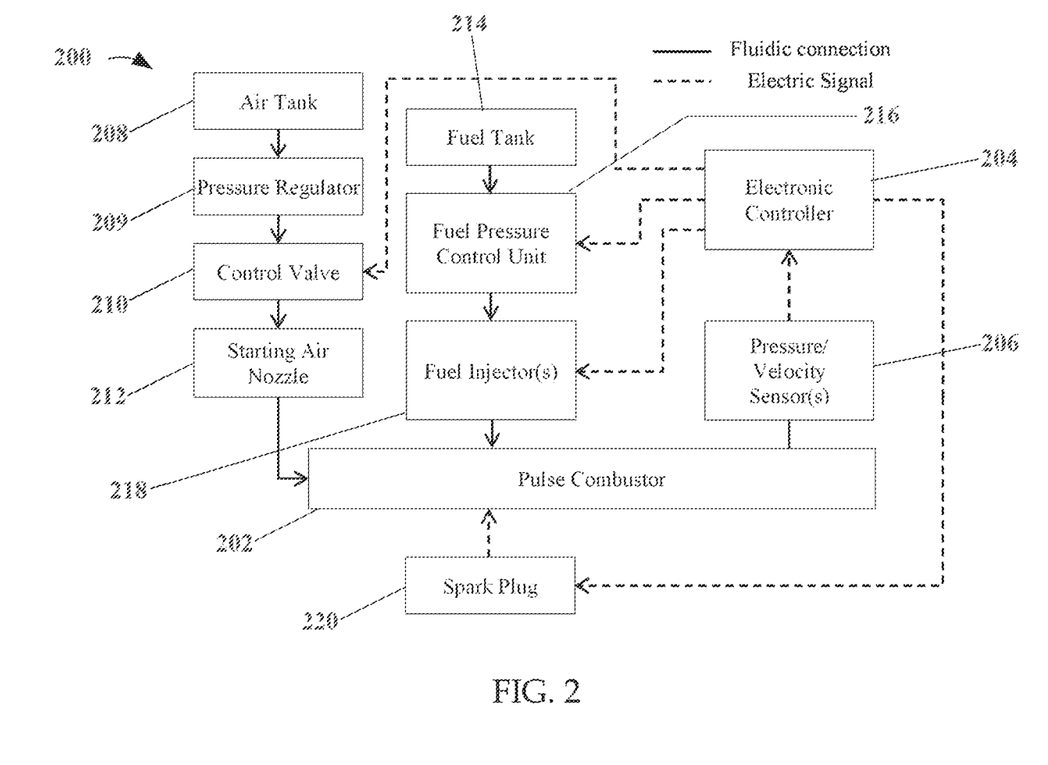
FIG. 2 shows a representative block diagram of an embodiment of the system of the present invention for start-up and control pulse combustor operations.
Figure 3:
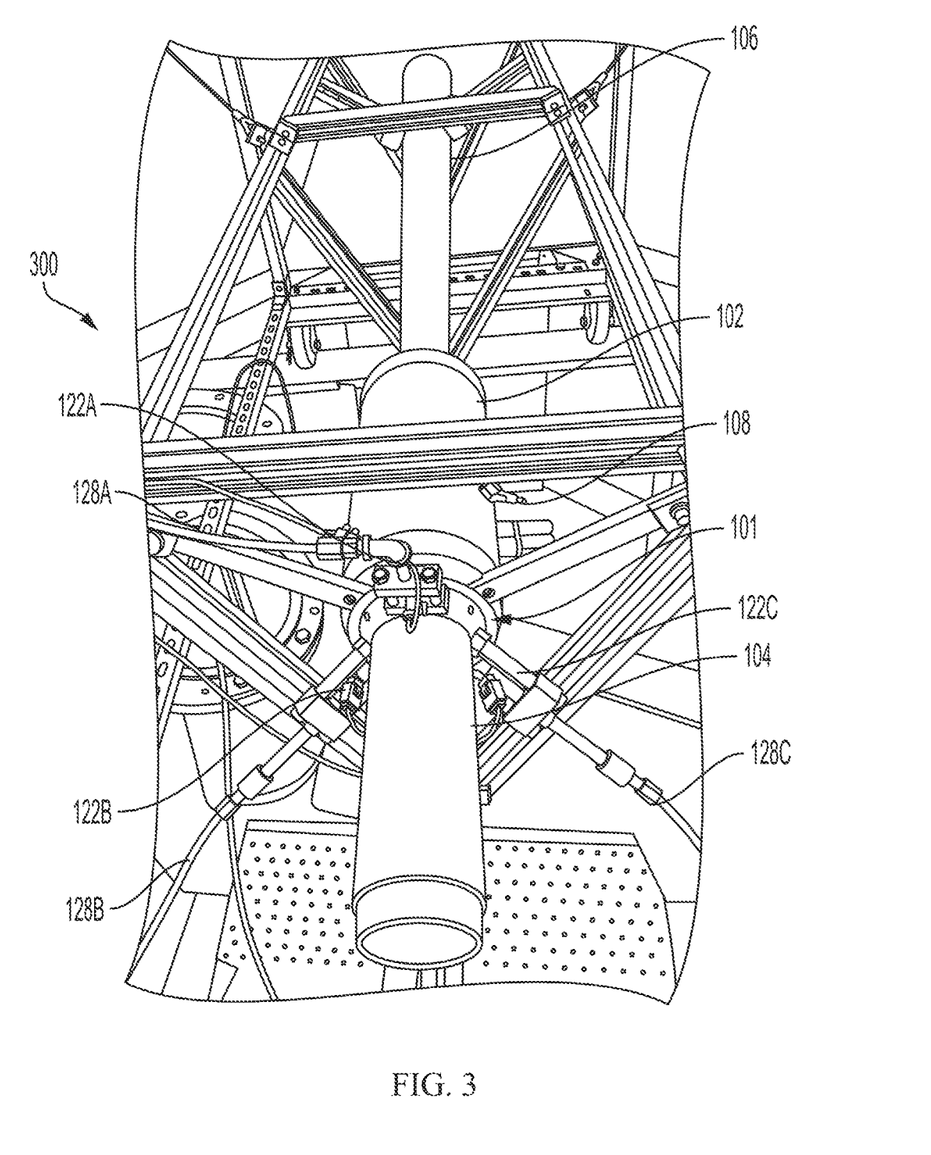
FIG. 3 shows a representative photograph of an embodiment of the present invention that shows multiple injectors that can be selectively turned on and off for start-up and control of the shown pulsejet engine.

The following are the reference numbers that are used in FIGS. 1-3:

| FIG. 1 | |
|---|---|
| 100 | Schematic diagram showing a representative embodiment of a system for start-up and control of pulse combustor operations |
| 101 | Pulse Combustor |
| 102 | Combustion Chamber |
| 104 | Inlet Pipe |
| 106 | Exhaust Pipe |
| 108 | Spark Plug |
| 110 | Spark Plug Control Signal Line |
| 112 | Air Supply Tank |
| 113 | Air Pressure Regulator |
| 114 | Air Valve |
| 115 | Air Pressure Regulator Control Signal Line (if electrical Air Pressure Regulator) |
| 116 | Starting Air Nozzle |
| 120 | Fuel Tank |
| 122 | Fuel Injector |
| 123 | Fuel Injector Signal Control Line |
| 118 | Air Valve Control Signal Line |
| 124 | Fuel Pressure Control Unit ("FPCU") |
| 126 | Fuel Line 1 from Fuel Tank to FPCU |
| 128 | Fuel Line 2 from FPCU to Fuel Injector |
| 130 | FPCU Control Signal Line |
| 132 | Pressure Sensor |
| 134 | Pressure Sensor Control Line |
| 136 | Electronic Engine Controller (Pulse Combustor Controller) |

| FIG. 2 | |
|---|---|
| 200 | Block diagram showing a representative embodiment of a system for start-up and control of pulse combustor operations |
| 202 | Pulse Combustor |
| 204 | Electronic Engine Controller (Pulse Combustor Controller) |
| 206 | Pressure/Velocity Sensor(s) |
| 208 | Air Supply Tank |
| 209 | Air Pressure Regulator |
| 210 | Air Valve |
| 212 | Starting Air Nozzle |
| 214 | Fuel Tank |
| 216 | FPCU |
| 218 | Fuel Injector(s) |
| 220 | Spark Plug |

| FIG. 3 | |
|---|---|
| 300 | Representative photograph of an embodiment of the present invention that shows multiple injectors |
| 102 | Combustion Chamber |
| 104 | Inlet Pipe |
| 106 | Exhaust Pipe |
| 108 | Spark Plug |
| 122A | Fuel Injectors |
| 122B | |
| 122C | |
| 128A | Fuel Lines 2 from FPCU to Fuel Injector |
| 128B | |
| 128C | |

DETAILED DESCRIPTION OF THE INVENTION

FIG. 1, generally at 100, shows a representative schematic drawing of an embodiment of the present invention for start-up and control of pulse combustors. In FIG. 1, pulse combustor 101 preferably includes inlet pipe 104 that connects to combustion chamber 102. Combustion chamber 102 also connects to exhaust pipe 106. The pulse combustor also includes one or more fuel injector(s) 122 of which only one is shown in FIG. 1. A better view of multiple injectors being associated with a pulse combustor is shown at FIG. 3, which will be described in detail later in the specification. When multiple injectors are used, they are located around inlet pipe 104 or combustion chamber 102. In each case, the fuel injectors point inwardly toward the interior of the structure on which they are disposed. However, a person of ordinary skill in the art would understand that the multiple fuel injectors, their locations, quantities, and geometries may be varied and still be within the scope of the present invention.

In this specification, it is understood that the following terms shall be interpreted as follows: "pulse combustor," "pulse jet engine," "pulse jet," "pulsejet engine," or "pulsejet" are all meant to refer to the same device. It is further understood that a pulsejet or pulsejet engine is a pulse combustor that is used for thrust production.

Further, for purposes of this specification, low-throttle operations, mid-throttle operations, and high-throttle conditions will have the following meanings:

Low-Throttle Conditions: From zero thrust to approximately one-third of maximum thrust.

Mid-Throttle Conditions: From approximately one-third of maximum thrust to approximately two-thirds of maximum thrust.

High-Throttle Conditions: From approximately two-thirds of maximum thrust to maximum thrust.

Other operating states of pulse combustors are contemplated by the present invention and they include an "idle" condition, which is the lowest stable and reliable engine operational/throttle setting, often used when engine power is not required by a vehicle. The idle condition/setting is typically a sub-operating condition of the low-throttle condition.

Again referring to FIG. 1, spark plug 108 is shown located in a position with respect to combustion chamber 102 so that it can provide sparks for igniting a fuel-air mixture in combustion chamber 102 for starting the engine and sustaining engine operation after it has started. Spark plug 108 is controlled by electronic engine controller 136. Electronic engine controller 136 sends electrical control signals to spark plug 108 through spark plug control signal line 110. Preferably, spark plug 108 generates sparks at a frequency that is higher than the operational/combustion frequency of the pulsejet engine. Nominally, this frequency is two times or more than the operational/combustion frequency. It is within the scope of the present invention that other ignition devices, such as a glow plug, can also be used for igniting the fuel-air mixture in combustion chamber 102. In the case of a glow plug, the glow plug would be powered constantly at least during the startup process.

As shown in FIG. 1, starting air nozzle 116 is pointed into inlet pipe 104 to supply starting air. Starting air nozzle 116 connects to high-pressure air supply tank 112 through air valve 114 and air pressure regulator 113. The opening and closing of air valve 114 is controlled by electronic engine controller 136. Electronic engine controller 136 sends operating signals to air valve 114 over air valve control signal line 118. Electronic engine controller 136 can also be connected to air pressure regulator 113 if the air pressure regulator is an electrically controlled regulator and not a mechanical air pressure regulator. If it is an electrically controlled air pressure regulator then, it will electrically connect to electronic engine controller over air pressure regulator control signal line 115 that is shown in phantom. In such case, the electronic engine controller can control the pressure of the air being delivered to air valve 114 from air tank 112 by electrical signals being sent over air pressure regulator control signal line 115. If air pressure regulator 113 is a mechanical air pressure regulator, it can be manually set to a predetermined air pressure value and air will be delivered to air valve 114 at that pressure until it changed at air pressure regulator 113. Both types of air pressure regulators are within the scope of the present invention.

Fuel tank 120 supplies fuel to pulse combustor 101 through fuel pressure control unit ("FPCU") 124 and fuel injector 122. Although, only one fuel injector is shown in FIG. 1, it is understood that multiple fuel injectors may be employed according to the system and method of the present invention and these fuel injectors can be selectively opened and closed to effect low-throttle conditions at engine startup and appropriately varying engine operation after startup.

Preferably, FPCU 124 includes a pump and pressure regulator. Fuel from fuel tank 120 is transmitted to the pump in FPCU 124 through fuel line 1 at 126 and the pressure regulator regulates the pressure of the fuel output from the pump. Although, FPCU is shown as including a pump and pressure regulator, it would be understood by a person of ordinary skill in the art that other devices, structures, or systems could replace the FPCU and it would still be within the scope of the present invention.

The fuel output from the pump that is under pressure is transmitted to fuel injector 122 through fuel line 2 at 128. The amount and timing of fuel delivery by fuel injector 122 is controlled by electronic engine controller 136. The appropriate electrical control signals are sent from electronic engine controller 136 to FPCU 124 and fuel injector 122. Electronic engine controller 136 sends electrical control signals to the pressure regulator in FPCU 124 on FPCU control signal line 130. Fuel injector 122 will provide the pressurized fuel into inlet pipe 104 under the control of electronic engine controller 136. The electrical control signals for controlling the opening and closing of fuel injector 122 are sent on fuel injector signal control line 123.

In FIG. 1, electronic engine controller 136 provides control signals to spark plug 108, air valve 114, air pressure regulator 113 (if the air pressure regulator is not a mechanical air pressure regulator), fuel injector 122, and FPCU 124. Electronic engine controller 136 also connects to pressure sensor 132. Pressure sensor 132 senses the pressure within combustion chamber 102 and provides that pressure reading in the form of an electrical signal to electronic engine controller 136 through pressure sensor control line 134. It is within the scope of the present invention, electronic engine controller 136 may also receive information regarding the state of pulse combustor 101 from velocity and/or pressure sensors placed on/around the pulse combustor, such as, placements with respect to combustion chamber 102, inlet pipe 104, and/or exhaust pipe 106. Electronic engine controller 136 monitors the electrical signals received from the velocity and/or pressure sensors and once recognizing through these signals that the engine has started, it, under program control, for example, from the system operator, will operate the pulsejet engine according to instructions as to the operating state to be achieved or maintained. The system operator providing program control can be programmed firmware associated with the electronic engine controller, a computer-based device, carried out manually by a human operator through an appropriate computer-based device, or wirelessly from a remote location using an appropriate computer-based device. All of these are in the scope of the present invention.

It is understood that spark plug 108, air valve 114, air pressure regulator 113 (if the air pressure regulator is not a mechanical air pressure regulator), FPCU 124, sensor 132, and electronic engine controller 136 are connected to an electrical power source for powering them. Appropriate power sources include batteries, generators, or other appropriate electrical energy generating/producing devices. These and others are contemplated to be within the scope of the present invention.

FIG. 2, generally at 200, shows a representative block diagram of an embodiment of a system of the present invention for start-up and control pulse combustor operations. In FIG. 2, the electrical and fluid connections between the system elements are shown according to the legend. According FIG. 2, pressure/velocity sensor(s) 206 receives measurement from pulse combustor 202 that is representative of the pressure/velocity state within pulse combustor 202 according to the sensor(s) being used. Pressure/velocity sensor(s) convert that measurement to an electrical signal that is transmitted to electronic engine controller 204. Depending on the current state of pulse combustor 202 that is represented by the electrical signal received by electronic engine controller 204 that is under operator control, electrical control signals will be generated for starting pulse combustor 202, maintaining the current operating state of the pulse combustor, or varying the operating state of the pulse combustor to a different operating level.

If the electrical signals received by electronic engine controller 204 are indicative of the engine being in a pre-start-up condition, according to programming, electrical control signals will be sent from electronic engine controller 204 to air valve 210, air pressure regulator 113 (if the air pressure regulator is not a mechanical air pressure regulator), FPCU 216, fuel injector(s) 218, and spark plug 220. The timing of each of the electrical signals will cause the appropriate amount of pressurized air to be pumped into inlet pipe 104 (FIG. 1) to mix with fuel that is sprayed into inlet pipe 104 from fuel injector(s) 122 (FIG. 1). This fuel-air mixture is forced into combustion chamber 102 (FIG. 1) where it is ignited by spark plug 108 (FIG. 1) under the control of electronic engine controller 204. As indicated in FIG. 2, there is a fluid flow of air from air supply tank 208 to air pressure regulator 209 to air valve 210 to starting air nozzle 212 to pulse combustor 202. In a similar fashion, there is a fluid flow of fuel from fuel tank 214 to FPCU 216 to fuel injector(s) 218 to pulse combustor 202.

If the electrical signals received by electronic engine controller 204 from pressure/velocity sensor(s) 206 are indicative of pulse combustor 202 being in an operating state sometime after start-up, the appropriate electrical control signals that will be generated by electronic engine controller 204 need be sent only to FPCU 216 and fuel injector(s) 218. This is because once the engine has started it will no longer need the input of starting air to inlet pipe 104. However, the igniting sparks from spark plug 200 may also be turned off but they also may still be provided at a frequency greater than the operating frequency of the engine. The combustion products from the previous combustion event will ignite the fuel-air mixture charge that is sucked into combustion chamber 102 due to the negative pressure condition that is within combustion chamber 102 (FIG. 1).

Referring to FIGS. 1 and 3, a detailed description of the novel method of the present invention will be provided. The system of the present invention includes an Electronic Fuel Injection ("EFI") system that has the ability through electronic engine controller 136 to control starting air nozzle 116, spark plug 108, and independently controllable fuel injector(s) 122. Preferably, electronic engine controller 136 will selectively activate and deactivate fuel injectors 122 during engine operation to vary the overall supply rate of fuel to pulse combustor 101. To do this, electronic engine controller 136 includes the features, in addition to the duty cycle, that will permit it to affect the overall fuel flow rate and pattern to produce a wider throttle range, increase efficiency, and provide greater stability in engine operation and lessen the likelihood the engine will shut down due to injection timing inaccuracies or physical cycle-to-cycle variation.

As an example and referring to FIG. 3, pulse combustor 101 includes three fuel injectors shown at 122A, 122B, and 122C. These fuel injectors are controlled by an electronic engine controller (not shown) so that two injectors are not activated and only one is activated. This will result in two-thirds less fuel being injected into the pulse combustor over a given period of time. In the case of minimum fuel injector flow settings, not activating two injectors allows two-thirds less fuel to be injected into the pulse combustor, than if all three injectors were activated, thereby decreasing the minimum possible amount of fuel that can be injected into the engine, and thereby increasing the throttle range.

By not activating two fuel injectors and activating a single fuel injector at a higher duty cycle, it is also possible to inject only the needed amount of fuel into pulse combustor 101 and not an excess amount of fuel, which would be the case, if all three fuel injectors were activated. This method of holding a fewer number of injectors open for a longer period of time can be advantageous for engine stability and start-up, as will be discussed, or for combustion control.

According to the present invention, when pulse combustor 101 is being started-up, it is advantageous not to activate one or more fuel injectors 122. This will result in a fewer number of fuel injectors 122 needed to be held open/on for as long as practically possible in a given amount of time up to the maximum length of the duty cycle. The result is also a lower overall fuel flow with a high duty cycle as compared to when all of the fuel injectors are activated and this substantially increases the likelihood of the pulse combustor start-up and having operational stability at a low-throttle condition.

The start-up method for pulse combustor 101 with the EFI system of the present invention can be automated in a predetermined manner under computer-based control. An exemplary automated start-up method using electronic engine controller 136 includes electronic engine controller 136 turning on spark plug 108, opening air valve 114 to provide air under pressure from starting air nozzle 116 into inlet pipe 104 and operating fuel injector 122A (FIG. 3) in a high duty cycle mode with the other fuel injectors, 122B and 122C (FIG. 3), not being activated. Once stable, periodic combustion according to a predetermined frequency and amplitude is sensed by pressure and/or velocity sensor(s) 132 and reported to electronic engine controller 136, air valve 114 is closed and spark plug 108 will cease receiving activation control signals. Preferably, the pulse combustor start-up process can be completed in less than 1 second. This described start-up method can be implemented on pulsejet engines disposed in, or on, a flight vehicle whether the flight vehicle is on the ground or in-flight.

Referring to FIG. 3, generally at 300, a representative photograph of an embodiment of the present invention is shown that shows multiple injectors that can be selectively activated and deactivated for start-up and control of the pulse combustor 101. FIG. 3 shows combustion chamber 102, inlet pipe 104, exhaust pipe 106, spark plug 108, and multiple fuel injectors 122A, 122B, and 122C. Also shown in this figure is the fuel line 2 for each of the three fuel injectors that connects between FPCU 124 and the respective fuel injector 122A, 122B, and 12C. Specifically, FIG. 3 shows fuel line 2 at 128A that connects to fuel injectors 122A, fuel line 2 at 128B that connects to fuel injector 122B, and fuel line 2 at 128C that connects to fuel injector 122C. The three fuel injectors are shown spaced 120° apart around inlet pipe 104. It is understood that there can be more or less than three fuel injectors associated with a pulse combustor and their spacing and location on the pulse combustor can be varied and still be within the scope of the present invention.

Fuel injectors 122A, 122B, and 122C operate in a high-temperature environment and, preferably, they are cooled by the pressurized fuel flowing through them. However, if there is no fuel flow-through a fuel injector over an extended period of time, the fuel injectors can become damaged from the heat. The system and method of the present invention overcomes this problem. A preferred method to overcome this potential heat problem is to selectively activate different fuel injectors in a predetermined pattern after a certain amount of time or after a certain number of combustion cycles. These novel methods allows fuel to sequentially or, in another predetermined manner, pass through and cool all of the fuel injectors, even when a reduced number of injectors are activated at any given time.

For example, referring to FIG. 3, shown generally at 300, if pulse combustor 101 is fitted with three fuel injectors, such as fuel injectors 122A, 122B, and 122C, and only one is required to be activated, electronic engine controller 136 can be programmed to operate the three fuel injectors according to the following method so that they will remain cool and not be damaged by heat: activate and operate fuel injector 122A for 1 second, then, deactivate this fuel injector; activate and operate fuel injector 122B for the next 1 second, then, deactivate this fuel injector; and activate and operate fuel injector 122C Injector 3 for the next 1 second, then deactivate this fuel injector. This pattern of activating and deactivating the plurality of fuel injectors will allow them to be cooled by the pressurized fuel passing through them and reduce the risk of heat damage to them.

Aspects of the subject matter described herein can be implemented in digital electronic circuitry, or in computer software, firmware, or hardware, including the structural means disclosed in this specification and structural equivalents thereof, or in combinations of them. Further, aspects of the subject matter described herein can be implemented using one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

It is contemplated that systems, devices, methods, and processes of the disclosure invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously. The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

Noting the foregoing, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A deflagration pulse combustor system with improved startup and control comprising:
   a deflagration pulse combustor further comprising
   an inlet pipe having a proximal and distal end, with the inlet pipe having a first length and being in fluid communication with a combustion chamber,
   an exhaust pipe having a proximal and distal end, with the exhaust pipe having a second length greater than the first length of the inlet pipe and being in fluid communication with the combustion chamber,
   the combustion chamber having a first end having a first opening for connecting to the proximal end of the inlet pipe for fluid communication between the combustion chamber and the inlet pipe and a second end having a second opening for connecting to the proximal end of the exhaust pipe for fluid communication between the combustion chamber and exhaust pipe,
   a plurality of three or more fuel injectors disposed around at least the inlet pipe or the combustion chamber for injecting fuel under pressure into the inlet pipe or combustion chamber for mixing with air ingressing from the distal end of the inlet pipe to form combustible fuel-air mixtures,
   an ignition subsystem disposed on the combustion chamber for providing means for igniting discrete fuel-air mixtures within the combustion chamber to cause combustion events, with each combustion event causing gas jets to be output from the distal ends of the inlet and exhaust pipes, and
   a sensor subsystem for continuously monitoring predetermined physical properties within the combustion chamber and generating output electrical signals representative of operating states of the deflagration pulse combustor that includes at least a pre-startup operating state and a plurality of continuous operating states after pulse combustor startup; and
   an air supply subsystem with a capability to provide air under predetermined pressure into the inlet pipe;
   a fuel supply subsystem with a capability to provide fuel under predetermined pressure to the plurality of fuel injectors; and
   a deflagration pulse combustor controller electrically connected to the air supply subsystem, the plurality of fuel injectors, the ignition subsystem, and the sensor subsystem, with the deflagration pulse combustor controller electrically controlling the air subsystem, the fuel supply subsystem, the plurality of fuel injectors, and the ignition subsystem, and receiving electrical signals from the sensor subsystem, and with the deflagration pulse combustor controller further controlling selective activation and deactivation of fuel injectors of the plurality of fuel injectors for start-up and each of the plurality of continuous operating states of the deflagration pulse combustor to increase a throttle range of the deflagration pulse combustor, including changing the activation and deactivation of fuel injectors during any continuous operating state and such activation and deactivation of the fuel injectors for portions of, or during, a maximum duty cycle of the deflagration pulse combustor and when fewer than a total number of fuel injectors are activated, the activated fuel injector(s) are operated for a longer duty cycle than when the total number of fuel injectors are activated; wherein in a mode of operation, all the plurality of fuel injectors are used simultaneously during the maximum duty cycle.

2. The system as recited in claim 1, wherein the air supply subsystem includes a pressurized air tank that is in fluid communication with a controllable air pressure regulator, with the air pressure regulator being in fluid communications with an electrically controllable air valve that is electrically connected to the pulse combustor controller, with the air pressure regulator delivering air at predetermined pressure levels to the air valve and with the air valve being activated by the pulse combustor controller for supplying air to the inlet pipe for start-up of the deflagration pulse combustor.

3. The system as recited in claim 1, wherein the plurality of fuel injectors is selectively activated and deactivated by the pulse combustor controller for at least low-throttle, mid-throttle, and high-throttle operations of the deflagration pulse combustor or other predetermined continuous operating states of the deflagration pulse combustor.

4. The system as recited in claim 3, wherein the plurality of fuel injectors is selectively activated and deactivated by the pulse combustor controller for low-throttle or mid-throttle operations of the deflagration pulse combustor for pulse combustor startup or idling.

5. The system as recited in claim 4, wherein fewer than the total number of fuel injectors are activated during pulse combustor startup or idling for less than up to the maximum duty cycle of the deflagration pulse combustor.

6. The system as recited in claim 1, wherein the fuel supply subsystem includes a fuel tank that is in fluid communication with a pump subsubsystem, with the pump subsubsystem in fluid communication with the plurality of fuel injectors, and with the pulse combustor controller being electrically connected to the pump subsubsystem for controlling the pressure of the fuel being output from the pump subsubsystem for input to the plurality of fuel injectors.

7. The system as recited in claim 6, wherein the pulse combustor controller sends electrical control signals to the plurality of fuel injectors for selectively activating and deactivating the fuel injectors according to predetermined portions of a duty cycle for specific predetermined operating states of the deflagration pulse combustor.

8. The system as recited in claim 1, wherein the ignition subsystem includes a spark plug electrically connected to the pulse combustor controller.

9. The system as recited in claim 1, wherein the sensor subsystem includes a pressure sensor or a velocity sensor, or a combination of pressure and velocity sensors.

10. The system as recited in claim 1, wherein the pulse combustor controller includes a programmable computer-based device.

11. The system as recited in claim 10, wherein the pulse combustor controller is capable of receiving operating instructions from a system operator.

12. The system as recited in claim 10, wherein the pulse combustor controller receives electrical signals from the sensor subsystem, with the pulse combustor controller determining an operating state of the deflagration pulse combustor according to at least measurements of physical properties within the combustion chamber that the sensor subsystem converts to electrical signals representative of the measurements and the pulse combustor controller programmatically controls the operating states of the deflagration pulse combustor.

13. The system as recited in claim 12, wherein the pulse combustor controller receives electrical signals from the sensor subsystem, with the pulse combustor controller determining an operating state of the deflagration pulse combustor according to commands to the fuel supply subsystem and measurements of physical properties within the combustion chamber that the sensor subsystem converts to electrical signals representative of the measurements and the pulse combustor controller programmatically controls the operating states of the deflagration pulse combustor.

14. The system as recited in claim 12, wherein the pulse combustor controller will begin a startup process for the deflagration pulse combustor if the pulse combustor controller determines the electrical signals received from the sensor subsystem are representative of the deflagration pulse combustor not being in a continuous operating state, the pulse combustor controller will send electrical control signals to the fuel supply subsystem to provide fuel under pressure to the fuel injectors, send electrical control signals to the air supply subsystem to input air into the inlet pipe or combustion chamber, send electrical control signals to the fuel injectors to selectively activate one or more of fuel injectors for injection of fuel into the inlet pipe or combustion chamber to form discrete fuel-air mixtures with air from the air supply subsystem, and send electrical control signals to the ignition subsystem for causing ignition of the discrete fuel-air mixtures in the combustion chamber to start the deflagration pulse combustor.

15. The system as recited in claim 12, wherein the pulse combustor controller will control continuous operation of the deflagration pulse combustor if the pulse conductor controller determines the electrical signals received from the sensor subsystem are representative of the deflagration pulse combustor being in a continuous operating state, the pulse combustor controller will send electrical control signals to the fuel supply subsystem to provide fuel under pressure to the fuel injectors, send electrical control signals to the fuel injectors to selectively activate from one to a total number of fuel injectors for injecting fuel in the inlet pipe or combustion chamber to form discrete fuel-air mixtures at a rate to match the predetermined operating state of the deflagration pulse combustor, and cease sending electrical control signals to activate the air supply subsystem.

16. The system as recited in claim 1, wherein the pulse combustor controller includes
a first programmable computer-based device electrically connected to the air supply subsystem, the fuel supply subsystem, the plurality of fuel injectors, ignition subsystem, and sensor subsystem, and
a remotely located second programmable computer-based device that is wired or wirelessly connected to the first programmable computer-based device.

17. The system as recited in claim 16, wherein the first and second programmable computer-based devices are capable of receiving operating instructions from a system operator.

* * * * *